No. 835,558. PATENTED NOV. 13, 1906.
E. RUTTKAMP.
MIXING MACHINE.
APPLICATION FILED JAN. 24, 1906.
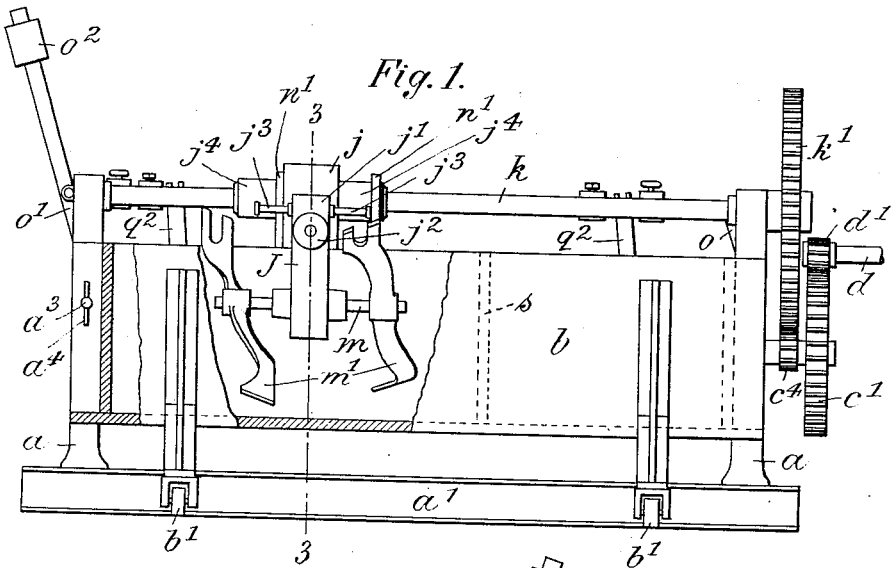
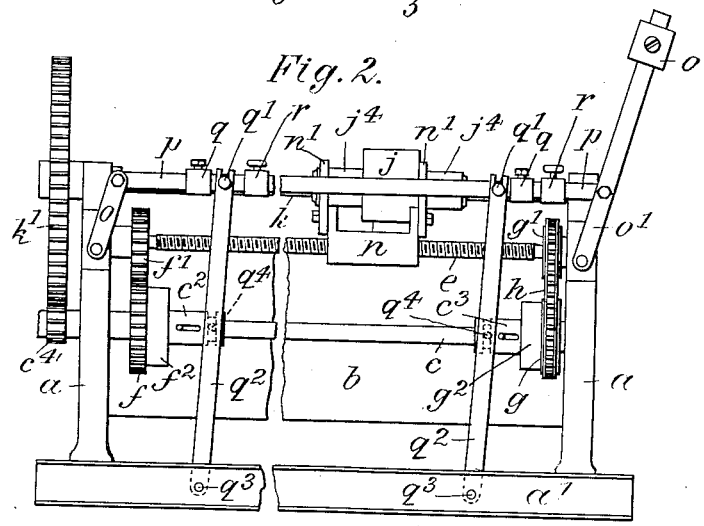
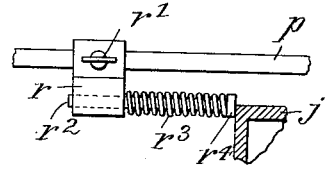
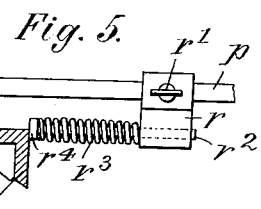
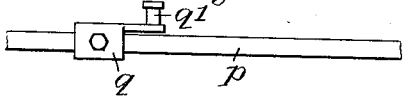
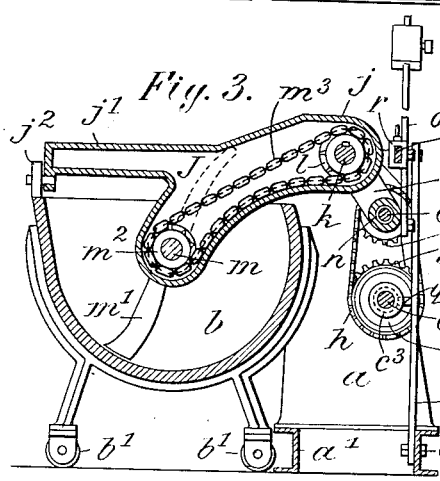
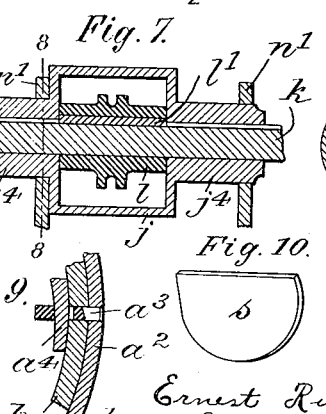
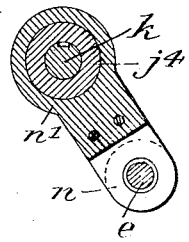
Witnesses:
Inventor
Ernest Ruttkamp

UNITED STATES PATENT OFFICE.

ERNEST RUTTKAMP, OF JERSEY CITY, NEW JERSEY, ASSIGNOR TO RUTTKAMP-MINCKE CO., OF JERSEY CITY, NEW JERSEY, A CORPORATION OF NEW JERSEY.

MIXING-MACHINE.

No. 835,558.  Specification of Letters Patent.  Patented Nov. 13, 1906.

Application filed January 24, 1906. Serial No. 297,592.

*To all whom it may concern:*

Be it known that I, ERNEST RUTTKAMP, a citizen of the United States, residing at Jersey City, Hudson county, State of New Jersey, have invented new and useful Improvements in Mixing-Machines, of which the following is a specification.

This invention relates to a dough-mixing machine which is so constructed that all parts of the dough are thoroughly subjected to the action of the beaters. The machine is provided with means for coupling different troughs successively to the beating mechanism and with means for operating with equal efficiency upon larger or smaller batches of dough.

In the accompanying drawings, Figure 1 is a front elevation of my improved mixing-machine with the trough partly broken away; Fig. 2, a rear elevation, partly broken away, thereof; Fig. 3, a cross-section on line 3 3, Fig. 1. Figs. 4 and 5 are details of the tappets; Fig. 6, a detail of part of the shipping-bar with clamp; Fig. 7, a longitudinal section through the carriage; Fig. 8, a cross-section on line 8 8, Fig. 7; Fig. 9, a detail of the coupling between frame and trough, and Fig. 10 a detail of the removable partition.

The machine comprises, essentially, a frame carrying the beaters and a trough containing the dough or sponge and adapted to be removably coupled to said frame. The beaters rotate and reciprocate intermittently within the trough, so that all the dough is thoroughly treated, and an accumulation of insufficiently-mixed dough at the ends of the trough is avoided. When the dough has been thoroughly mixed, the beaters are swung up and the trough is uncoupled from the frame and moved to another part of the bake-shop, where it may be used as a bench, while a second trough containing a fresh batch of dough is coupled to the frame. Thus any suitable number of troughs may be used in conjunction with the same mixing mechanism, so that valuable space is economized and economy is practiced.

The letters $a$ indicate a pair of uprights mounted upon a suitable base $a'$, the whole constituting the frame of the machine.

$b$ represents a trough supported on casters $b'$ and adapted to be removably coupled to the frame. The front sides of uprights $a$ have concave sections $a^2$ of a curvature corresponding to that of the trough, Fig. 9. A perforated pin $a^3$ of each upright $a$ extends through an opening of trough $b$ and is locked thereto by a curved wedge $a^4$.

In uprights $a$ is journaled a counter-shaft $c$, rotated from power-shaft $d$ by gear-wheels $d'$ $c'$. The shaft $c$ rotates a lead-screw $e$ alternately in opposite directions. To this effect there are loosely mounted on shaft $c$ a gear-wheel $f$ and a chain-wheel $g$. Wheel $f$ intergears with a wheel $f'$, fast on lead-screw $e$, and is provided with a relatively fixed member $f^2$ of a clutch, the movable member $c^2$ of which is slidable on shaft $c$. Wheel $g$ is by chain $h$ connected to a chain-wheel $g'$, fast on screw $e$, and is provided with the relatively fixed clutch member $g^2$, coöperating with the slidable member $c^3$. By alternately coupling the wheels $f$ $g$ to shaft $c$ in manner hereinafter described the desired rotation of screw $e$ alternately in opposite directions will be effected.

J represents a carriage slidable on a shaft $k$, which is rotated from shaft $c$ by gear-wheels $c^4$ $k'$. Shaft $k$ is provided with a longitudinal groove engaged by a feather $l'$ of a chain-wheel $l$, which is thus slidable on the shaft and rotatable therewith. Chain-wheel $l$ is inclosed within an enlargement or housing $j$ of carriage J, the side walls of which engage wheel $l$ and feather $l'$, so that any reciprocating movement imparted to the carriage will be transmitted to the wheel and feather. Within housing $j$ is journaled a shaft $m$, projecting laterally out of the same and carrying the beaters or mixing-blades $m'$. Shaft $m$ is rotated from wheel $l$ by chain $m^3$ and wheel $m^2$. The front of housing $j$ is extended to form an arm $j'$, having a roller $j^2$, adapted to rest on the top of trough $b$, so as to sustain the carriage in position during the mixing operation. When this operation is completed, the carriage is swung up on shaft $k$ by handles $j^3$, so as to lift the beaters out of the trough.

From each end of housing $j$ projects a hub $j^4$, which is embraced by a perforated arm $n'$, formed at the end of a nut or threaded sleeve $n$, which travels upon lead-screw $e$. The distance between the arms $n'$ $n'$ is greater than the width of housing $j$, Figs. 1, 2, and 7, so that the lugs have a certain play along hubs $j^4$. Motion is imparted to carriage J from nut $n$ when the arms $n'$ engage the sides of housing $j$, which thus constitute stops, and therefore the nut runs idle for some time before taking the carriage along. The consequence is that the reciprocating movement of the nut is converted into an intermittent reciprocating movement of the carriage, the latter remaining stationary on the shaft $k$ for some time at the ends of the race before commencing its return movement.

The means for operating the clutch members $c^2$ $c^3$ of shaft $c$ are as follows: To uprights $a$ is connected by pivoted links $o$ $o'$ a longitudinally-slidable shipping-bar $p$. Link $o'$ is extended upwardly beyond its connection with bar $p$ and carries an overbalancing-weight $o^2$. Rod $p$ is provided with a pair of clamps $q$, having pins $q'$, which are engaged by the upper forked ends of levers $q^2$, pivoted to base $a'$ at $q^3$. One of the levers $q^2$ engages by pin $q^4$ the clutch member $c^2$, while the second lever $q^2$ engages in like manner clutch member $c^3$. Thus by the means described the rod $p$ upon being reciprocated will operate the clutches in the manner desired, so that when one of the clutches is closed the other is open.

Upon rod $p$ are adjustably mounted by clamp-screws $r'$ a pair or tappets $r$. Each tappet is perforated to accommodate a plunger $r^2$, influenced by spring $r^3$, and having a head $r^4$, adapted to be engaged by housing $j$ of carriage J. When the carriage arrives near the end of its race, it will push plunger $r^2$ in the direction of its travel and compress spring $r^3$. The carriage will then by spring $r^3$ and tappet $r$ move rod $p$ in the direction desired, thus oscillating links $o$ $o'$. The object of the spring $r^3$ is to throw the overbalanced link $o'$ rapidly over, thus overcoming the dead-center.

If it is desired to mix a comparatively small batch of sponge, a transverse partition $s$ is fitted into trough $b$, so as to subdivide the same into a pair of compartments, either one of which may be charged with the sponge. One of the tappets $r$ is in this case so adjusted that the race of carriage J is reduced to correspond to the length of the compartment charged with the sponge.

What I claim is—

1. In a mixing-machine, a trough, a carriage provided with beaters, means for imparting an intermittent reciprocatory and rotary movement to the beaters, a reciprocating member, spring-actuated elements carried by the reciprocating member for engagement by the carriage to shift the reciprocating member and automatically reverse the direction of movement of the carriage.

2. In a mixing-machine, a lead-screw, and a threaded sleeve having arms, combined with a slidable carriage having stops adapted to be engaged by said arms, and beaters connected to the carriage the distance between the arms being greater than the distance between the stops, substantially as specified.

3. In a mixing-machine, a lead-screw, and a threaded sleeve having arms, combined with a slidable carriage having stops adapted to be engaged at opposite sides alternately by said arms, and beaters connected to the carriage the distance between the arms being greater than the distance between the stops, substantially as specified.

4. In a mixing-machine, a lead-screw, and a threaded sleeve having perforated arms, combined with a slidable carriage having laterally-projecting hubs embraced by said arms, and beaters connected to the carriage, substantially as specified.

5. In a mixing-machine, a shaft, a lead-screw, a pair of clutches for coupling said parts, a threaded sleeve mounted on the lead-screw, a carriage engaged thereby, beaters connected to the carriage, a shipping-rod having tappets, spring-actuated plungers slidable in the tappets, an overbalanced link pivoted to the shipping-rod, and means for operatively connecting said rod to the clutches, substantially as specified.

6. In a mixing-machine, a lead-screw, a sleeve movable longitudinally upon said screw and provided with arms, a carriage adapted to be engaged by said arms, and means for moving the sleeve on the lead-screw independently of the carriage at the beginning of each stroke of the sleeve.

7. In a mixing-machine, a trough, and a mixing mechanism provided with beaters, means for reciprocating the beaters within the trough, said means being reciprocal independently of the beaters at each end of their stroke.

8. In a mixing-machine, a trough and a mixing mechanism provided with rotary beaters, means for reciprocating the beaters in the trough, and means for arresting the reciprocation of the beaters at the end of each stroke.

9. In a mixing-machine, a trough, and a mixing mechanism provided with beaters, means for imparting a rotary and reciprocatory movement to the beaters, and means for limiting the beaters to one of said movements temporarily at one end of their stroke.

Signed by me at New York city, (Manhattan,) New York, this 23d day of January, 1906.

ERNEST RUTTKAMP.

Witnesses:
  FRANK V. BRIESEN,
  WILLIAM SCHULZ.